2,991,199
PROCESS FOR PREPARING HEAT SEALABLE FILMS, COMPOSITIONS USEFUL THEREIN AND THE ARTICLES PRODUCED THEREBY
William R. R. Park, Midland, and Richard D. Foley, Bay City, Mich., assignors to The Dow Chemical Company, Midland, Mich., a corporation of Delaware
No Drawing. Filed Sept. 15, 1958, Ser. No. 760,847
26 Claims. (Cl. 117—138.8)

This invention relates to a process for imparting heat sealing properties to films which are normally incapable of being heat sealed with conventional apparatus. The invention further contemplates a novel coating composition useful in said process and coated articles prepared by said process.

One of the problems facing the flexible film converter is the attainment of proper closures and seams for packages which he manufactures. Such closures and seams may be made with pressure sensitive adhesives or with mechanical closures, such as staples. Both of those methods require multi-step manipulations and are usually inadequate when an impervious seal is desired. With many materials which are thermoplastic, the closures and seams may be formed by drawing the edges of the bag or pouch between two heated shoes to provide a continuous, impervious heat seal. Such a heat sealing technique is well adapted and has been universally accepted for use with high speed packaging operations and is inexpensive in operation. The seals are continuous and as impermeable as the material from which the packaging material is made. However, many materials, such as oriented polystyrene film and the films of like styrene polymers, although thermoplastic, cannot be self-sealed in such manner. When polystyrene film is attempted to be sealed thermally with the conventional heated-bar sealers, the result is either that no seal is formed, or an unattractive and unsatisfactory mass of molten polymer, or a shirred discontinuous seal due to shrinkage caused by loss of the orientation of the film.

Oriented styrene polymeric film materials and the like are valuable, flexible packaging films. The extent of their use would be even more widespread if a satisfactory process for heat sealing were available.

The previous coating means for imparting heat sealability to such materials required the use of a primer to achieve adequate adherence of the heat sealable coating. The heat sealable coating was applied over this primer. Such processes and techniques require the inventory of two separate coating compositions and the use of two separate manipulative steps with two independent apparatuses. Thus these two-step processes were time consuming and expensive in operation and captial investment.

It is accordingly the principal object of this invention to provide a process for imparting heat sealing properties to those flexible films of styrene polymers which films of themselves are incapable of being conveniently heat sealed using conventional apparatus.

It is a further object to provide such a process which involves but a single coating step.

A still further object is the provision of a novel coating composition finding use in said process.

Another object is the provision of such a composition based on a single solution of polymeric materials.

Still another object is the provision of a coated article which is capable of heat sealability.

The above and related objects are accomplished by the process consisting of applying to the monoalkenyl aromatic polymer article a continuous coating of a film-forming solution consisting essentially of (1) a polyvinyl acetal; (2) a polyester of an alkyl substituted benzoic acid and a polyol; (3) an anti-block ingredient; (4) a plasticizer for said polyvinyl acetal; and (5) an organic solvent for the said ingredients listed in (1) to (4) followed by drying said continuous coating into a continuous adherent fused coating.

The films which are contemplated as subject materials for use in the process of this invention are those flexible films and foils as well as semi-rigid and rigid articles prepared from polystyrene and other monoalkenyl aromatic polymers containing at least 50 percent by weight of a monoalkenyl aromatic monomer having from 6 to 10 carbon atoms in the aryl nucleus and of the general structure: CH=CR—Ar, wherein R is methyl or hydrogen and Ar is the aryl nucleus. By such monoalkenyl aromatic polymers and copolymers it is intended to include the resinous thermoplastic materials resulting from the polymerization of monovinyl aromatic monomers, such as para-methylstyrene, alpha-methylstyrene, meta-ethylstyrene, ortho-para-dimethylstyrene, ortho-para-diethylstyrene, para-chlorostyrene, isopropylstyrene, ortho-methyl-para-isopropylstyrene and ortho - para - dichlorostyrene, and also those materials resulting from the co-polymerization of styrene with alpha-methylstyrene or with one or more of any of the above named compounds. Thermoplastic copolymerizates of styrene or of the other aforementioned compounds with other monoethylenically unsaturated monomers, such as acrylonitrile, may also be used. The term "mono-alkenyl aromatic polymer" as used herein is intended to include the thermoplastic polymers and copolymers of monoalkenyl aromatic compounds having the alkenyl radical directly attached to a carbon atom of an aromatic nucleus which compounds may also contain one or more alkyl or halogen atoms as nuclear substituents, just described.

Flexible films may be prepared from the above described thermoplastic materials by thermal fabrication, specifically thermal extrusion. Processes, techniques, and apparatuses for such fabrication are known. Other techniques include the solvent casting or dipping of the compositions from a volatile solvent followed by evaporation of that solvent. As prepared such films must be oriented for flexibility. Unoriented films are so brittle and weak in other properties as to have no commercial utility in packaging or similar uses. Flexible films of these polymerizates of monoalkenyl aromatic monomers may be prepared in a variety of gauges, thicknesses, colors and widths. Since the modifications contemplated by this invention involve primarily surface phenomena, they are adaptable to any size, shape or thickness where uniform coatings may be applied. The modifications are useful with moldings, extrusions, or any other thick section of a rigid or semi-rigid nature. With such articles of thick section the need for heat sealability is rather remote. Consequently, the attainment of that property alone may not be justification for treatment. However, the process results in other advantages as will be described. Thus, it is not intended to limit the process or the resulting articles to any particular size or shape, although heat sealable-flexible films are the preferred end products.

The basic film-forming ingredient of the composition is a polyvinyl acetal. The function of the polyvinyl acetal is to provide a continuous coherent heat sealable film. The polyvinyl acetals are a well known class of resins produced by the interaction of polyvinyl alcohol with aldehydes. Methods for their preparation are well known in the literature as exemplified in the reference; "Synthetic Resins and Allied Plastics" R. S. Morrell, Oxford University, London, page 209 (1943). Typical of the commercially available materials are "Alvar 5/80" sold commercially by Shawinigan Chemical Company.

This material contains about 80 percent acetal resin. Other typical resins are "Bakelite XYSG" and "Bakelite XYHL" sold commercially by Union Carbide and Carbon Company which contain 80.7 percent vinyl butyral, 19 percent vinyl alcohol and 0.3 percent vinyl acetate. Other similar resins are known.

The polyester component is composed of an alkyl substituted benzoic acid wherein said alkyl substituent contains from 1 to about 8 carbon atoms with polyols including alkylene glycols, polyalkylene glycols, glycerol and the like. Typical of such polyesters and representing a preferred species is the product of para-tertiary-butyl-benzoic acid and trimethylol ethane. Similar polyesters will be known and available to the worker in the art. The polyester functions to provide adherence of the coating to the substratum.

In addition to the polymeric components the composition also contains a small amount of an anti-block agent. These may be waxes or certain hard resinous materials. Waxes suitable for the compositions are those having a melting point of at least 60° C. and preferably those that melt between about 60° and 100° C. Those with lower melting points cause the coated films to block. Typical representative of such waxes are those of the following groups: (a) the true waxes, i.e., the esters of high molecular weight monohydric alcohols and higher fatty acids, examples of which are spermaceti, carnauba, montan, beeswax, Japanese wax, Chinese insect wax, etc.; (b) synthetic esters of polyhydric alcohols with the higher fatty acids, e.g., 1,2-hydroxy stearin, glycol stearate, diethylene glycol laurate etc.; (c) high melting fats, such as tallow (ordinarily used in conjunction with one of the other types); (d) synthetic esters of monohydric alcohols with the higher fatty acids, e.g., phenoxy ethyl stearate, lauryloxyethyl laurate, palmitic and stearic esters of the alcohols obtained by reducing palm of sperm oil fatty acids, (e) monohydric alcohols from the hydrogenation of natural oil fatty acids, and (f) monohydric alcohols from the saponification of waxes such as myricyl alcohol, cetyl alcohol and ceryl alcohol. The preferred wax is carnauba wax.

The hard resinous materials include those such as "Versamid 930" sold commercially by General Mills Company. This product is believed to be the condensation product of ethylene diamine with dimerized fatty acids. Other products will be known.

The block temperature mentioned above is the minimum temperature at which two surfaces of film in face to face contact will not slip apart when placed under an applied pressure for a time which is arbitrarily selected. The block temperature is of significance when the film is rolled up on itself and is shipped and stored in such manner. Likewise after conversion to bags and pouches the block temperature assumes an importance not only in shipping and storing, but also in feeding into package filling apparatus. For most commercial applications it has been found that this block temperature should be at least 140° F. when placed under an applied pressure of 1 pound per square inch for 24 hours. The anti-block agent then is a material which will raise the block temperature above 140° F.

It has been found that the hard resinous materials are prefered anti-block agents since the resulting compositions may be applied at room temperature. This results from the room temperature solubility of the hard resinous material in the organic solvent employed as the vehicle. The use of waxes requires a somewhat elevated temperature of up to about 70° C. to assure solubility of the wax in the organic solvent. Either of the anti-block agents, however, once incorporated homogeneously into the coating will impart the desired resistance to block.

The fourth component of the composition is a small amount of a plasticizer for the film-forming polymeric materials. Such plasticizers are well known in the art. Typical of such materials are the dialkyl phthalates containing from 1 to about 8 carbon atoms in each ester group, tricresyl phosphate and others. Dibutyl phthalate represents a preferred species to be employed in the compositions.

The compositions are in the form of an organic solution of the film-forming components. The useful solvents are those for the polyvinyl acetals and other materials. Such solvents are well known as indicated in the Morrell reference cited supra. Most of the commercially available polyvinyl acetals are soluble in the lower alkanols having from 1 to about 4 carbon atoms and these are the preferred solvents. Those polyvinyl acetals of even high replacement are soluble in dioxane acetic acid and chlorinated solvents. It should be apparent that the solvent employed should be a non-solvent or a very poor solvent for the substratum. The solubility characteristics of the monoalkenyl polymers in, for example, aromatic solvents are well known.

The proportions of the components making up the composition include about 40 parts of the polyvinyl acetal; from 5 to 40 parts and preferably from 5 to 15 parts of the polyester; from 2 to 20 parts and preferably from 3 to 5 parts of the anti-blocking agent; from 0.5 to 3.0 parts and preferably from 0.8 to 1.2 parts of the plasticizers or ingredients dissolved in from 300 to 800 parts and preferably from 300 to 500 parts of solvent. Any substantial departure from the above proportions will have such adverse effect on one or more of the properties such as adhesion, heat sealability, clarity or others as to preclude the use of the combination in the herein claimed process and application. For example, less than the indicated amount of polyester will result in unsatisfactory adherence while more will result in no additional benefit and may lower the heat seal strength. The solution concentration permits relatively wide variation. This concentration will be determinable by the coating thickness desired by the viscosity or fluidity desired with the coating technique to be used and by the solubility characteristics of the resin-solvent combination desired. Solutions of lower concentrations will generally result in dried coatings of thinner section than those of higher concentration. The viscosity of a coating composition that is to be used in brushing or rolling techniques will generally be greater than that of a composition which is to be sprayed. Any of these determinants may be easily checked by simple preliminary experiments and the optimum solute concentration determined.

The compositions are easily prepared by known mixing methods and techniques. The order of addition of the ingredients is not critical. It is only necessary that uniform and homogeneous distribution be attained.

The coating of this process may be applied by known coating techniques including brushing, roller coating, dipping, spraying or other means. To maintain uniform reproducible properties and characteristics it is essential that the coating be of substantially uniform thickness. Thus after application or simultaneously therewith but before drying, there may be used known doctoring means such as doctor blades or squeeze rolls. After each coating application the coating is dried into a continuous coherent coating. That drying may occur at room temperature although it is preferred to employ slightly elevated temperatures of 60° to 70° C. which appreciably shorten the drying step. Temperatures which are significantly higher than 70° C. should usually be avoided, since they tend to distort the shape or in some instances to destroy or at least alter the orientation, properties and characteristics of the substratum. To achieve heat sealability and other desirable properties it is only necessary that the dried coatings completely cover the surface to be coated. As a practical matter such coatings will, if conventional coating techniques are followed be of a thickness of at least about 0.00005 inch. Additionally, coatings which are greater than about 0.05 inch are difficult to dry without special apparatus and methods and impart little or no significant improvement in properties over the less thick coatings. It is preferred to have the coatings of a thickness of from about 0.0001 to 0.05 inch.

The articles prepared in accordance with this invention have the functional advantages of laminate-like structures. Thus the strength, toughness, flexibility and other like properties of the coated article are determined mainly by the substratum. Other properties such as heat sealability, barrier characteristics and solubility are determined by the coating. Adherence of the coating to the substratum also is inherent in the coating composition. Thus all of the materials must be used in the previously described proportions if the desired results are to be attained.

The articles may be treated in accordance with this invention on either one or all surfaces depending upon the end use for which the article is to be employed. The articles after treatment may have impressions printed or stamped thereon usually without affecting the barrier, heat sealability or other properties. Also coated, flexible films and foils may be used with conventional wrapping and packaging machinery without serious affect on the coating.

The operation of the process and the advantages of the composition and article will be more apparent from the following illustrative examples wherein all parts and percentages are by weight unless otherwise indicated.

*Example*

A sample of bilaterally oriented polystyrene film of a thickness of about 0.001 inch was coated with a composition of the following ingredients. 40 parts of a polyvinyl acetal containing about 80 percent acetal resin and sold commercially as "Alvar 5/80"; 10 parts of a polyester sold commercially by the Archer-Daniels-Midland Company as "Arochem 650" (believed by analysis to be composed of para-t-butyl benzoic acid and trimethylol ethane); one part dibutyl phthalate; 5 parts of the condensation product of ethylene diamine with dimerized fatty acids and sold commercially as "Versamid 930" by The General Mills Company all dissolved in 400 parts of propanol. The coating was dried until clear. The dried coating thickness was about 0.0001 inch. The film was heat sealed to itself by placing two of the coating surfaces in contact and passing between the electrically heated jaws of a convention heat sealer. Continuous heat seals could be made by a jaw temperature of 185° F. The adhesion of the seal was tested by making a heat seal in the above manner which was 1 inch wide. One of the free ends of the modified film was clamped and the force required to pull the seal apart was determined. It was found that a force of 200 to 300 grams per inch was necessary to separate the so-formed heat seal. The adhesion of the coating to the substratum was checked by drying to separate the coating from the substratum using pressure sensitive tapes. No separation could be achieved in this manner.

Equal results were attained when the composition was prepared from 10 parts of a polyvinyl butyral sold commercially as "Bakelite XYHL"; 10 parts of the above polyester; 0.75 part of carnauba wax and 0.5 part of dibutyl phthalate, all dissolved in 100 parts of butanol. The composition was applied at 65° C. to the polystyrene film. Upon testing the adherence, heat seal strength, and resistance to block were very nearly the same as obtained above.

What is claimed is:

1. A process for imparting heat sealability to thermoplastic articles fabricated from the polymerizates of monoalkenyl aromatic monomers consisting of applying to at least one surface of said thermoplastic article a continuous uniform coating of a film forming composition consisting essentially of a solution of (1) about 40 parts by weight of a polyvinyl acetal; (2) from about 5 to 40 parts by weight of a polyester of an alkyl substituted benzoic acid having from 1 to 8 carbon atoms in the alkyl group and a polyol; (3) from about 2 to 20 parts by weight of an anti-blocking agent; (4) from 0.5 to 3 parts by weight of a plasticizer for said polyvinyl acetal, followed by drying said continuous coating into a continuous adherent fused coating.

2. The process claimed in claim 1, wherein said article is a flexible oriented film of polystyrene.

3. The process claimed in claim 1, wherein the solvent is a lower alkanol having from 1 to 4 carbon atoms.

4. The process claimed in claim 3, wherein said lower alkanol is propanol.

5. A coating composition useful for coating polymerizates of monoalkenyl monomers, said composition consisting essentially of a solution of (1) about 40 parts by weight of a polyvinyl acetal; (2) from about 5 to 40 parts by weight of a polyester of an alkyl substituted benzoic acid having from 1 to 8 carbon atoms in the alkyl group with a polyol; (3) from about 2 to 20 parts by weight of an anti-blocking agent; and (4) from 0.5 to 3 parts by weight of a plasticizer for said polyvinyl acetal, said ingredients dissolved in from 300 to 800 parts by weight of an organic solvent.

6. The coating composition claimed in claim 5, wherein said organic solvent is a lower alkanol having from 1 to 4 carbon atoms.

7. The coating composition claimed in claim 6, wherein said lower alkanol is propanol.

8. The coating composition claimed in claim 5, wherein said polyvinyl acetal contains about 80 percent acetal resin.

9. The coating composition claimed in claim 5, wherein said polyvinyl acetal is polyvinyl butyral.

10. The coating composition claimed in claim 5, wherein said polyester is that of para-t-butyl benzoic acid and trimethylol ethane.

11. The coating composition claimed in claim 5, wherein said anti-blocking agent is a condensation product of ethylene diamine and dimerized fatty acids.

12. The coating composition claimed in claim 5, wherein said anti-blocking agent is a wax melting above 60° C.

13. The coating composition claimed in claim 12, wherein said wax is carnauba wax.

14. The coating composition claimed in claim 5, wherein said plasticizer is a dialkyl phthalate having alkyl groups of from 1 to 8 carbon atoms.

15. The coating composition claimed in claim 14, wherein said dialkyl phthalate is dibutyl phthalate.

16. The article claimed in claim 26, wherein said polyvinyl acetal contains about 80 percent acetal resin.

17. The article claimed in claim 26, wherein said polyvinyl acetal is polyvinyl butyral.

18. The article claimed in claim 26, wherein said polyester is that of para-t-butyl benzoic acid and trimethylol ethane.

19. The article claimed in claim 26, wherein said anti-blocking agent is a condensation product of ethylene diamine and dimerized fatty acids.

20. The article claimed in claim 26, wherein said anti-blocking agent is a wax melting above 100° C.

21. The article claimed in claim 20, wherein said wax is carnauba wax.

22. The article claimed in claim 26, wherein said plasticizer is a dialkyl phthalate having alkyl groups of from 1 to 8 carbon atoms.

23. The article claimed in claim 22, wherein said dialkyl phthalate is dibutyl phthalate.

24. The article claimed in claim 26, wherein said substratum is a flexible oriented self-supporting film of polystyrene.

25. The article claimed in claim 26, wherein said continuous coating is from 0.00005 to about 0.05 inch in thickness.

26. A heat sealable article based on a substratum fabricated from a monoalkenyl aromatic polymer, said article consisting of said substratum and a dried continuous coating in continuous adherent relationship to said substratum, said dry continuous coating consisting essentially of a blend of (1) about 40 parts by weight of polyvinyl acetal; (2) from about 5 to 40 parts by weight of a polyester of an alkyl substituted benzoic acid having from 1 to 8 carbon atoms in the alkyl group and a polyol; (3) from about 2 to 20 parts by weight of an anti-blocking agent; and (4) from 0.5 to 3 parts by weight of a plasticizer.

References Cited in the file of this patent

UNITED STATES PATENTS

| | | |
|---|---|---|
| 2,492,512 | Zweig | Dec. 27, 1949 |
| 2,639,249 | Gurin et al. | May 19, 1953 |